United States Patent
Inoue et al.

(10) Patent No.: US 10,686,334 B2
(45) Date of Patent: Jun. 16, 2020

(54) WIRELESS POWER TRANSMISSION APPARATUS AND CONTROL METHOD FOR THE SAME

(71) Applicant: ROHM CO., LTD., Ukyo-Ku, Kyoto (JP)

(72) Inventors: Naoki Inoue, Kyoto (JP); Sayako Hamaguchi, Kyoto (JP); Xun He, Kyoto (JP)

(73) Assignee: ROHM CO., LTD., Kyoto (JP)

(*) Notice: Subject to any disclaimer, the term of this patent is extended or adjusted under 35 U.S.C. 154(b) by 176 days.

(21) Appl. No.: 15/806,758

(22) Filed: Nov. 8, 2017

(65) Prior Publication Data
US 2018/0131235 A1 May 10, 2018

(30) Foreign Application Priority Data
Nov. 10, 2016 (JP) ................. 2016-219926

(51) Int. Cl.
*H02J 50/12* (2016.01)
*H02M 7/5387* (2007.01)
*H02J 7/34* (2006.01)

(52) U.S. Cl.
CPC ............. *H02J 50/12* (2016.02); *H02J 7/345* (2013.01); *H02M 7/5387* (2013.01)

(58) Field of Classification Search
CPC .................. H04B 5/00; H02J 50/00

USPC ........................................... 307/104
See application file for complete search history.

(56) References Cited

U.S. PATENT DOCUMENTS

| | | | |
|---|---|---|---|
| 2009/0096413 A1* | 4/2009 | Partovi | H01F 5/003 320/108 |
| 2011/0285210 A1* | 11/2011 | Lemmens | H02J 5/005 307/104 |
| 2012/0007437 A1* | 1/2012 | Fells | H01F 38/14 307/104 |
| 2012/0038220 A1* | 2/2012 | Kim | H02J 7/025 307/104 |
| 2015/0061577 A1* | 3/2015 | Ye | H02J 7/025 320/108 |
| 2015/0341087 A1* | 11/2015 | Moore | H04B 5/0031 455/77 |
| 2016/0285278 A1* | 9/2016 | Mehas | H02J 50/12 |
| 2017/0033615 A1* | 2/2017 | Asanuma | H02J 5/005 |
| 2018/0294681 A1* | 10/2018 | Bae | H02J 50/80 |

\* cited by examiner

*Primary Examiner* — Adi Amrany
(74) *Attorney, Agent, or Firm* — Cantor Colburn LLP

(57) ABSTRACT

A controller controls an inverter. A signal level detection circuit generates a detection value $S_{DET}$ that corresponds to a voltage at a connection node that connects a series resonance capacitor and multiple transmission coils. The controller (i) drives the inverter 204 while sequentially selecting the multiple transmission coils, and acquires the detection value $S_{DET}$ from the signal level detection circuit. Furthermore, the controller (ii) determines a single transmission coil to be used for power supply, based on comparison results of the detection values $S_{DET}$ acquired for each transmission coil.

16 Claims, 9 Drawing Sheets

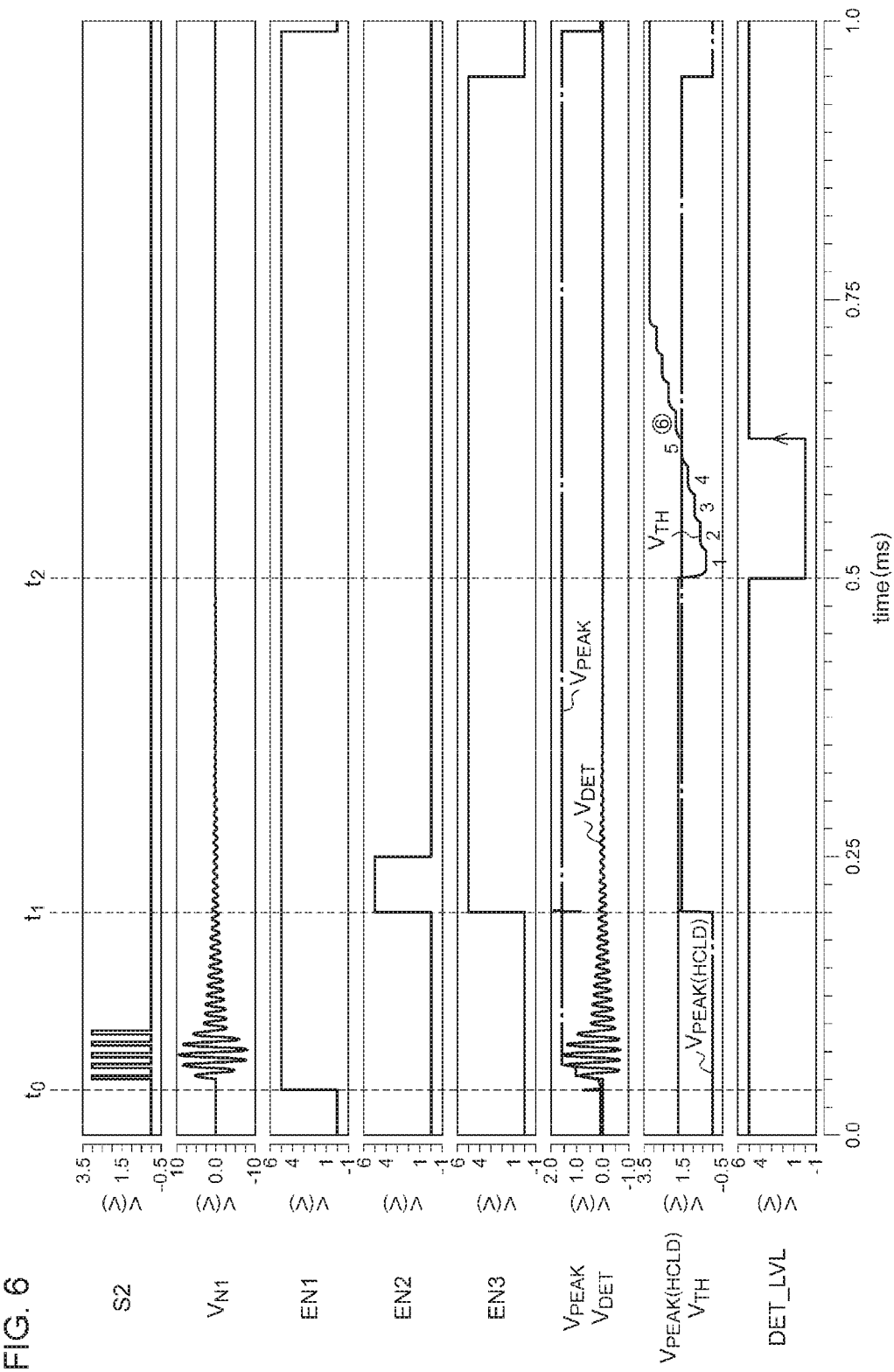

WIRELESS POWER TRANSMISSION APPARATUS AND CONTROL METHOD FOR THE SAME

CROSS-REFERENCE TO RELATED APPLICATIONS

The present invention claims priority under 35 U.S.C. § 119 to Japanese Patent Application No. 2016-219926, filed on Nov. 10, 2016, the entire content of which is incorporated herein by reference.

BACKGROUND OF THE INVENTION

1. Field of the Invention

The present invention relates to a wireless power supply technique.

2. Description of the Related Art

In recent years, in order to supply electric power to an electronic device, contactless power transmission (which is also referred to as "contactless power supply" or "wireless power supply") has begun to come into commonplace use. In order to advance the compatibility of products between manufacturers, the WPC (Wireless Power Consortium) has been organized, and the WPC has developed the Qi standard as an international standard.

FIG. 1 is a diagram showing a configuration of a wireless power supply system 100 that supports the Qi standard. The power supply system 100 includes a power transmission apparatus 200 (TX: power transmitter) and a power receiving apparatus 300 (RX: power receiver). The power receiving apparatus 300 is mounted on an electronic device, examples of which include cellular phone terminals, smartphones, audio players, game machines, and tablet terminals.

The power transmission apparatus 200 includes a transmission antenna 201, an inverter 204, a controller 206, and a demodulator 208. The transmission antenna 201 includes a transmission coil (primary coil) 202 and a resonance capacitor 203. The inverter 204 includes an H-bridge circuit (full-bridge circuit) or otherwise a half-bridge circuit. The inverter 204 applies a driving signal S1, specifically, in the form of a pulse signal, to the transmission coil 202. This provides a driving current flowing through the transmission coil 202, which generates an electric power signal S2 at the transmission coil 202 in the form of an electromagnetic signal. The controller 206 integrally controls the overall operation of the power transmission apparatus 200. Specifically, the controller 206 controls the switching frequency of the inverter 204, the duty ratio of the switching, or otherwise the phase thereof, so as to adjust the electric power to be transmitted. The controller 206 may be configured by means of a hardware component such as a logic circuit, FPGA (Field Programmable Gate Array), or the like. Also, the controller 206 may be configured in the form of a combination of a micro controller or a CPU (Central Processing Unit) and a software program.

In the Qi standard, a protocol is defined for communication between the power transmission apparatus 200 and the power receiving apparatus 300, which enables control data S3 to be transmitted from the power receiving apparatus 300 to the power transmission apparatus 200. The control data S3 is transmitted from a reception coil 302 (secondary coil) to the transmission coil 202 in the form of an AM (Amplitude Modulation) modulated signal using backscatter modulation. The control data S3 includes electric power control data (which will also be referred to as a "packet") which indicates an amount of electric power to be supplied to the power receiving apparatus 300, and data which indicates the particular information for identifying the power receiving apparatus 300. The demodulator 208 demodulates the control data S3 included in the current or otherwise the voltage applied to the transmission coil 202. The controller 206 controls the inverter 204 based on the power control data included in the control data S3 thus demodulated.

The power receiving apparatus 300 includes the reception coil 302, a rectifier circuit 304, a smoothing capacitor 306, a power supply circuit 308, a modulator 310, a demodulator 312, and a controller 314. The reception coil 302 receives the electric power signal S2 from the transmission coil 202, and transmits the control data S3 to the transmission coil 202. The rectifier circuit 304 and the smoothing capacitor 306 rectify and smooth a current S4 induced at the reception coil 302 according to the electric power signal S2, thereby converting the current S4 into a DC voltage $V_{RECT}$. The power supply circuit 308 stabilizes the DC voltage $V_{RECT}$, so as to generate an output voltage $V_{OUT}$. The output voltage $V_{OUT}$ is supplied to an unshown load circuit.

The controller 314 is configured as a micro controller or a CPU, for example. The controller 314 executes a software program so as to support the power supply that conforms to the Qi standard. For example, the controller 314 monitors the amount of electric power received by the power receiving apparatus 300. The controller 314 generates power control data (a control error value) that indicates electric power to be supplied, based on the monitored value. The modulator 310 changes the parallel resonant frequency of the reception antenna 301 based on the control data S3 including the power control data, so as to change the coil current and the coil voltage applied to the transmission coil 202, thereby providing information transmission.

The Qi standard allows control data S5 to be transmitted from the power transmission apparatus 200 to the power receiving apparatus 300. The control data S5 is superimposed on the electric power signal S2 using the FSK (Frequency Shift Keying) method, and transmitted from the transmission coil 202 to the reception coil 302. The control data S5 may include an acknowledgement (ACK) signal, which is a notice that the control data S3 has been received, and a negative acknowledgement (NAK) signal, which is a notice that no control data S3 has been received.

An FSK modulator 220 is built into the controller 206. The FSK modulator 220 changes the switching frequency of the inverter 204 according to the data to be transmitted. The demodulator 312 arranged on the power receiving apparatus 300 side demodulates the FSK-modulated control data (which will also be referred to as an "FSK signal") S5. The above is the configuration of the power supply system 100.

In recent years, the standard (which will simply be referred to as the PMA standard" hereafter) developed by the PMA (Power Matters Alliance) (now the standardizing body "AirFuel Alliance", which has been organized as an integration of the PWA and the A4WP) has also begun to come into commonplace use. As a result of investigating a power transmission apparatus 200 that supports both the power receiving apparatus 300 that conforms to the Qi standard and the power receiving apparatus 300 that conforms to the PMA standard, the present inventor has come to recognize the following problem.

In order to provided an enlarged chargeable area, multiple transmission coils are employed, which are arranged with offsets in the same plane. With the power transmission apparatus 200 including such multiple transmission coils, before the start of a power supply operation, the power transmission apparatus 200 selects one from among the transmission coils that exhibits the strongest coupling with the power receiving apparatus 300, and performs the power supply operation using the selected transmission coil.

The most reliable method for selecting the optimum one from among the multiple transmission coils is a method employing a digital ping defined by the Qi standard or the PMA standard. For example, with the Qi standard, in response to a digital ping sent by the power transmission apparatus 200, the power receiving apparatus 300 returns an SS (Signal Strength) packet that indicates the received signal strength. Accordingly, by sending the digital pings while switching the multiple transmission coils, and by comparing the SS packets, this arrangement is capable of selecting the optimum transmission coil.

With the PMA standard, by sending analog pings while switching the multiple transmission coils, this arrangement is capable of selecting the optimum transmission coil based on the results of the ping operation.

However, such a digital ping operation requires a large amount of electric power to be transmitted as compared with an analog ping operation. Furthermore, before performing the operation relating to such a digital ping operation, there is a need to start up a processor such as a micro controller or CPU. Such an arrangement has a problem of increased power consumption required for the overall system.

SUMMARY OF THE INVENTION

The present invention has been made in order to solve such a problem. Accordingly, it is an exemplary purpose of an embodiment of the present invention to provide a power transmission apparatus, and a control method employed by the power transmission apparatus, configured to select an optimum one from among multiple transmission coils without a need to receive a response from a wireless power receiving apparatus.

An embodiment of the present invention relates to a wireless power transmission apparatus structured to supply an electric power signal to a wireless power receiving apparatus. The wireless power transmission apparatus comprises: a transmission antenna comprising a series resonance capacitor and multiple switchable transmission coils; an inverter having an output coupled to the transmission antenna; a controller structured to control the inverter; and a signal level detection circuit structured to generate a detection value that corresponds to a voltage at a connection node that connects the series resonance capacitor and the multiple transmission coils. (i) The controller is structured to drive the inverter while sequentially selecting the multiple transmission coils, and to acquire the detection values from the signal level detection circuit. (ii) The controller is structured to determine a single transmission coil to be used for power supply, based on results of comparison of the detection values acquired for the respective transmission coils.

With this embodiment, this arrangement is capable of selecting an optimum transmission coil based on the electrical state of each transmission antenna without a need to receive a response from the wireless power receiving apparatus.

Also, the signal level detection circuit may comprise: a peak hold circuit structured to receive a signal that corresponds to a voltage at the connection node; and a quantization circuit structured to quantize an output voltage of the peak hold circuit so as to generate the detection value. By employing the peak hold circuit, this arrangement is capable of detecting the amplitude of an AC voltage that occurs at the connection node.

Also, the quantization circuit may comprise: a voltage dividing circuit structured to generate a threshold voltage by dividing a reference voltage with a voltage dividing ratio that can be controlled by the controller; and a comparator structured to compare an output voltage of the peak hold circuit with the threshold voltage. Also, the detection value may correspond to a set of outputs of the comparator acquired for each voltage dividing ratio.

Such an arrangement does not require the use of an A/D converter built into a processor such as a micro controller or a CPU. This allows the selection of the transmission coil in a state in which the operation of the processor is suspended. Furthermore, by providing a quantization circuit having a simple configuration instead of such an A/D converter, this suppresses an increase in the circuit area.

Also, the quantization circuit may comprise: a voltage dividing circuit structured to divide the output voltage of the peak hold circuit with a voltage dividing ratio that can be controlled by the controller; and a comparator structured to compare an output voltage of the voltage dividing circuit with the threshold voltage. Also, the detection value may correspond to a set of outputs of the comparator acquired for each voltage dividing ratio.

Such an arrangement does not require the use of an A/D converter built into a processor such as a micro controller or a CPU. This allows the selection of the transmission coil in a state in which the operation of the processor is suspended. Furthermore, by providing a quantization circuit having a simple configuration instead of such an A/D converter, this suppresses an increase in the circuit area.

The quantization circuit may comprise an A/D converter configured as an external component of the processor. Such an arrangement does not require the use of an A/D converter built into the processor such as a micro controller or a CPU. This allows the selection of the transmission coil to be made even in a state in which the operation of the processor is suspended.

Also, the peak hold circuit may comprise: a capacitor; and a charger circuit structured to use a voltage across the capacitor as a threshold value, and to charge the capacitor when an input voltage of the peak hold circuit exceeds the threshold value. This arrangement is capable of detecting peak value of the input voltage, and of holding the peak value thus detected.

Also, the charger circuit may comprise: a buffer circuit structured to receive the voltage across the capacitor; a comparator structured to compare an output voltage of the buffer circuit with the input voltage; and a current source structured to transit to an on state according to an output of the comparator, and to supply a current to the capacitor.

Also, the wireless power receiving apparatus may support the PMA standard. Also, in selection of the transmission coil, the controller may be structured to control the inverter so as to send a digital ping that conforms to the Qi standard.

Another embodiment of the present invention relates to a power transmission control circuit structured to control a wireless power transmission apparatus for supplying an electric power signal to a wireless power receiving apparatus. The wireless power transmission apparatus comprises: a transmission antenna comprising multiple switchable transmission coils; and an inverter having an output coupled to the transmission antenna. The power transmission control circuit comprises: a driver structured to drive the inverter; a logic circuit structured to control the driver, and to control selection from among the multiple transmission coils; a voltage detection pin structured to receive a detection voltage that corresponds to a voltage at a common connection node that connects the multiple transmission coils; a signal level detection circuit structured to convert the detection voltage into a multi-level detection value, and to output the multi-level detection value to the logic circuit; and an interface circuit structured as an interface between an external micro controller and the logic circuit. (i) The logic circuit operates the driver while sequentially selecting the multiple transmission coils, and acquires the detection values from the signal level detection circuit. (ii) The logic circuit determines a single transmission coil to be used for power supply, based on results of comparison of the multiple detection values thus acquired.

With this embodiment, this arrangement is capable of selecting the optimum transmission coil based on the electrical state of the transmission antenna without sending a digital ping that conforms to the method supported by the wireless power receiving apparatus. This allows the power transmission control circuit alone to select the coil without a function provided by an external processor.

Yet another embodiment relates to a wireless power transmission apparatus. The wireless power transmission apparatus may comprise any one of the aforementioned power transmission control circuits.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 6 is an operation waveform diagram showing a level judgment operation of the signal level detection circuit shown in FIG. 4;

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

Figure 1:
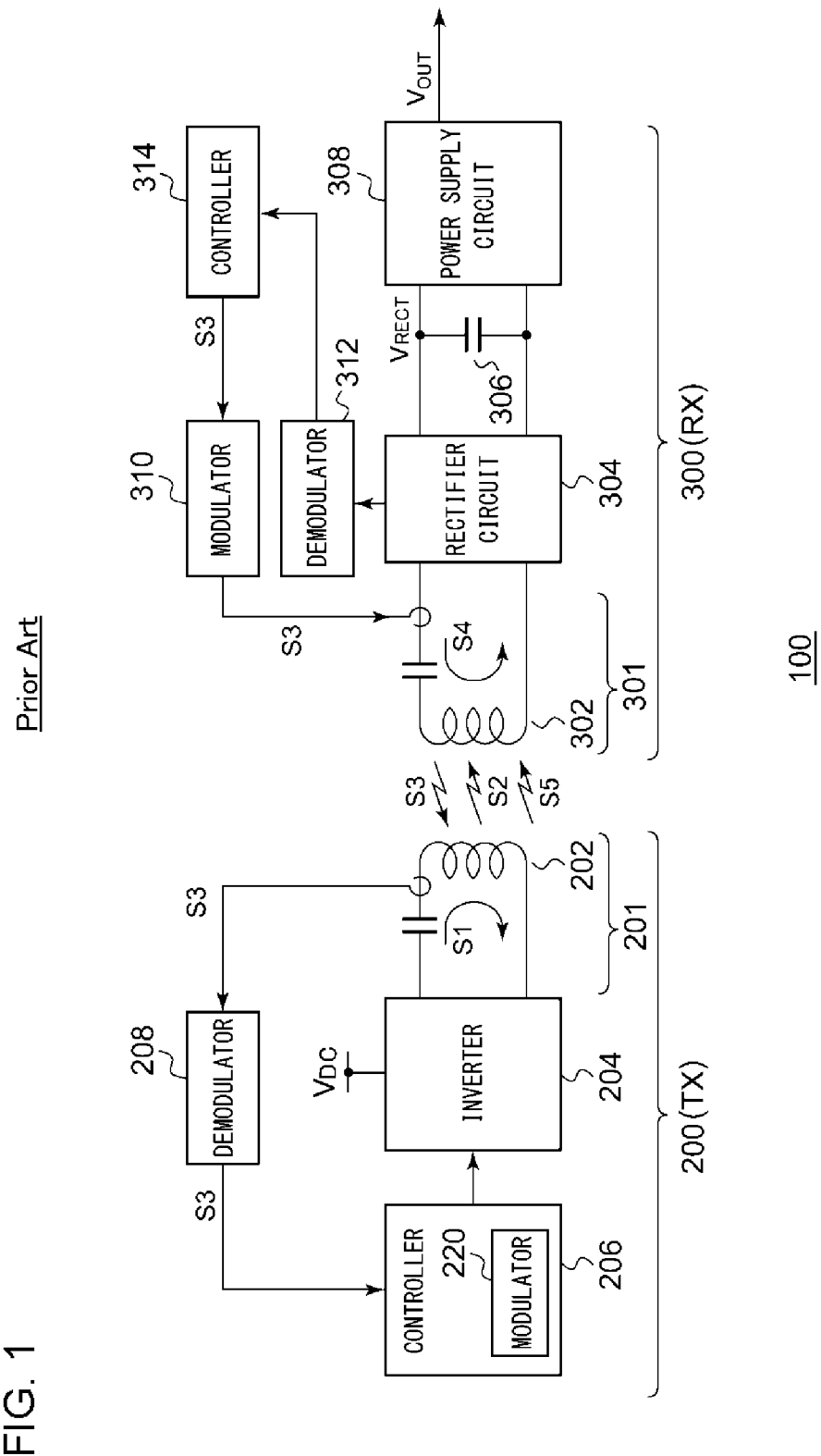
FIG. 1 is a wireless power supply system that support the Qi standard.
Figure 2:
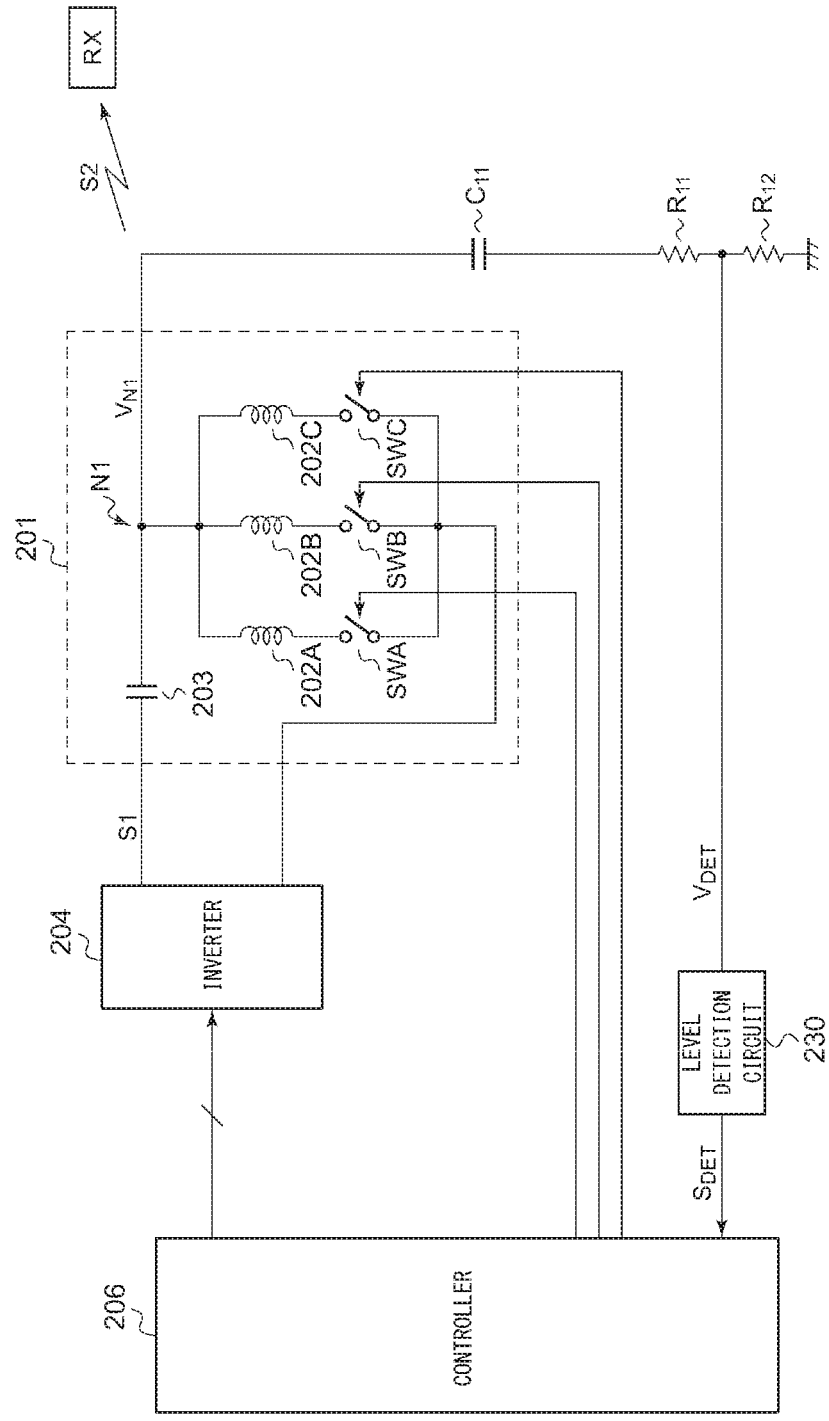
FIG. 2 is a block diagram showing a power transmission apparatus according to an embodiment.

FIG. 2 is a block diagram showing a power transmission apparatus 200 according to an embodiment. The power transmission apparatus 200 mainly includes a transmission antenna 201, an inverter 204, a controller 206, and a signal level detection circuit 230. In addition, the power transmission apparatus 200 is provided with a demodulator, etc., which are not shown in the drawing.

The transmission antenna 201 includes multiple switchable transmission coils 202. Specifically, the transmission antenna 201 includes multiple (in this example, three) transmission coils 202A through 202C and multiple switches SWA through SWC. The multiple transmission coils 202A through 202C are arranged on a charging stand with position offsets in the horizontal direction. The number of the transmission coils 202 is not restricted in particular. The power transmission apparatus 200 selects one from among the transmission coils that exhibits the strongest coupling with the power receiving apparatus RX. Subsequently, the power transmission apparatus 200 performs a power supply operation. Specifically, the power transmission apparatus 200 turns on one of the multiple switches SWA through SWC coupled in series with the transmission coil 202 thus selected, and turns off the remaining switches. A resonance capacitor 203 is coupled in series with the transmission coils 202A through 202C.

The inverter 204 is configured as a half-bridge circuit or otherwise a full-bridge circuit, and has its output coupled to the transmission antenna 201. The inverter 204 applies an AC driving signal S1 to the transmission antenna 201.

The controller 206 mainly performs the following operations.

The power receiving apparatus RX is detected.

Communication with the power receiving apparatus RX is controlled.

Upon detection of the power receiving apparatus RX, an optimum transmission coil is selected from among the multiple transmission coils 202 before the start of the power supply operation.

A power supply operation (power transfer operation) is performed for the power receiving apparatus RX using the transmission coil thus selected. In the power transfer phase, electric power to be transmitted is feedback controlled according to a request from the power receiving apparatus RX.

Foreign object detection (FOD) is performed.

Relating to the selection of the transmission coil, the signal level detection circuit 230 is provided. The signal level detection circuit 230 detects a voltage (which will be referred to as the "coil-end voltage") $V_{N1}$ at a connection node N1 that connects the multiple transmission coils 202 and the resonance capacitor 203, and outputs a detection value $S_{DET}$ of the coil-end voltage $V_{N1}$ to the controller 206. The coil-end voltage $V_{N1}$ has an amplitude that can reach a large value on the order of several dozen V. Accordingly, the detection voltage $V_{DET}$ obtained by dividing the coil-end voltage $V_{N1}$ by means of resistors $R_{11}$ and $R_{12}$ is preferably input to the signal level detection circuit 230. Also, an AC coupling capacitor $C_{11}$ may be provided between the resistor $R_{11}$ and the connection node N1.

The controller 206 drives the inverter 204 while sequentially selecting one from among the multiple transmission coils 202 (polling), and acquires the detection voltage $S_{DET}$ of the coil-end voltage $V_{N1}$ generated by the signal level detection circuit 230 in each state in which the corresponding one of the multiple transmission coils 202A through 202C is selected. The coil-end voltage $V_{N1}$ is an AC voltage having the same frequency as that of the power transmission frequency. The detection value preferably represents the amplitude of the AC voltage, i.e., the peak value. The controller 206 determines one transmission coil to be used for the power supply, based on the results of comparison of the multiple detection values $S_{DET}$ thus obtained.

Figure 3:
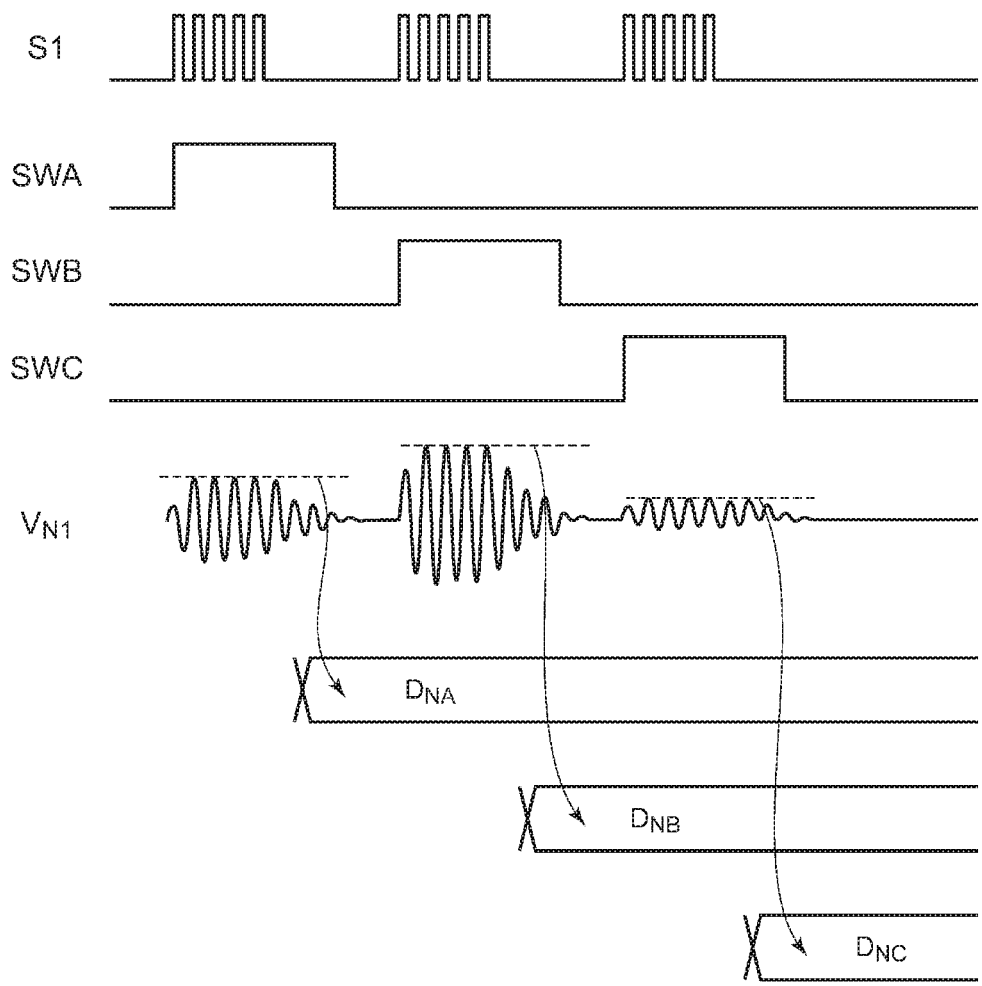
FIG. 3 is an operation waveform diagram showing an operation of the power transmission apparatus shown in FIG. 2.

The above is the configuration of the power transmission apparatus 200. Next, description will be made regarding the operation thereof. FIG. 3 is an operation waveform diagram showing the operation of the power transmission apparatus 200 shown in FIG. 2. It should be noted that the vertical axis and the horizontal axis shown in the waveform diagrams and the time charts in the present specification are expanded or reduced as appropriate for ease of understanding. Also, each waveform shown in the drawing is simplified or exaggerated for emphasis for ease of understanding.

When the power transmission apparatus 200 has detected the power receiving apparatus RX, the flow proceeds to a selection phase for selecting the transmission coil. In the selection phase, the controller 206 sequentially turns on the switches SWA, SWB, and SWC, so as to sequentially select the transmission coils 202A, 202B, and 202C. In each state in which the corresponding transmission coil 202 is selected, the controller 206 drives the inverter 204 so as to generate the driving voltage S1.

In each state in which the corresponding transmission coil is selected, the detection value $S_{DET}$ of the coil-end voltage $V_{N1}$ is generated, and is held by the controller 206. The controller 206 selects the optimum transmission coil 202 based on the detection values $D_{NA}$, $D_{NB}$, and $D_{NC}$, respectively acquired in a state in which a transmission coil 202A is selected, a state in which a transmission coil 202B is selected, and a state in which a transmission coil 202C is selected.

In a case in which the amplitude of the driving signal S1 is maintained at a constant value, the amplitude of the coil-end voltage $V_{N1}$ that occurs at the connection node N1 changes according to a change in the degree of coupling between the selected transmission coil 202 and the reception coil of the power receiving apparatus RX. Specifically, as the degree of coupling becomes higher, the amplitude of the coil-end voltage $V_{N1}$ becomes smaller. Accordingly, the controller 206 may sequentially selects the multiple transmission coils 202 so as to measure the detection value $S_{DET}$ for each transmission coil. Also, the transmission coil for which the measurement value of the detection value $S_{DET}$ is the minimum may be selected as the coil to be used. Also, the controller 206 may select the transmission coil for which the measurement value of the detection value $S_{DET}$ is smaller than a predetermined threshold value.

The above is the operation of the power transmission apparatus 200. Next, description will be made regarding the advantages thereof.

With the power transmission apparatus 200, the optimum transmission coil can be selected based on the electrical state of the transmission antenna 201 without a need to receive a response from the power receiving apparatus RX.

This means that, in order to select the transmission coil, the power transmission apparatus 200 is not necessarily required to send a digital ping that conforms to the method (standard) supported by the power receiving apparatus RX. Accordingly, as described below, this allows the time required to select the transmission coil to be reduced.

For example, in a case in which the signal level detection circuit 230 has very high detection precision, the power transmission apparatus 200 may send only an analog ping without sending a digital ping, and may select the transmission coil based on the coil-end voltage that occurs as a result of sending the analog ping.

In a case in which the power supply apparatus RX conforms to one of multiple methods (standards), with conventional techniques, there is a need to send digital pings that conform to the respective methods, and the transmission coil is selected based on the response results. In contrast, with the present embodiment, an analog ping is sent according to any one of the multiple methods. The transmission coil may be selected based on the coil-end voltage that occurs as a result of such a digital ping operation.

The present invention encompasses various kinds of apparatuses and circuits that can be regarded as a block configuration or a circuit configuration shown in FIG. 2, or otherwise that can be derived from the aforementioned description. That is to say, the present invention is not restricted to a specific configuration. More specific description will be made below regarding an example configuration for clarification and ease of understanding of the essence of the present invention and the circuit operation. That is to say, the following description will by no means be intended to restrict the technical scope of the present invention.

Figure 4:
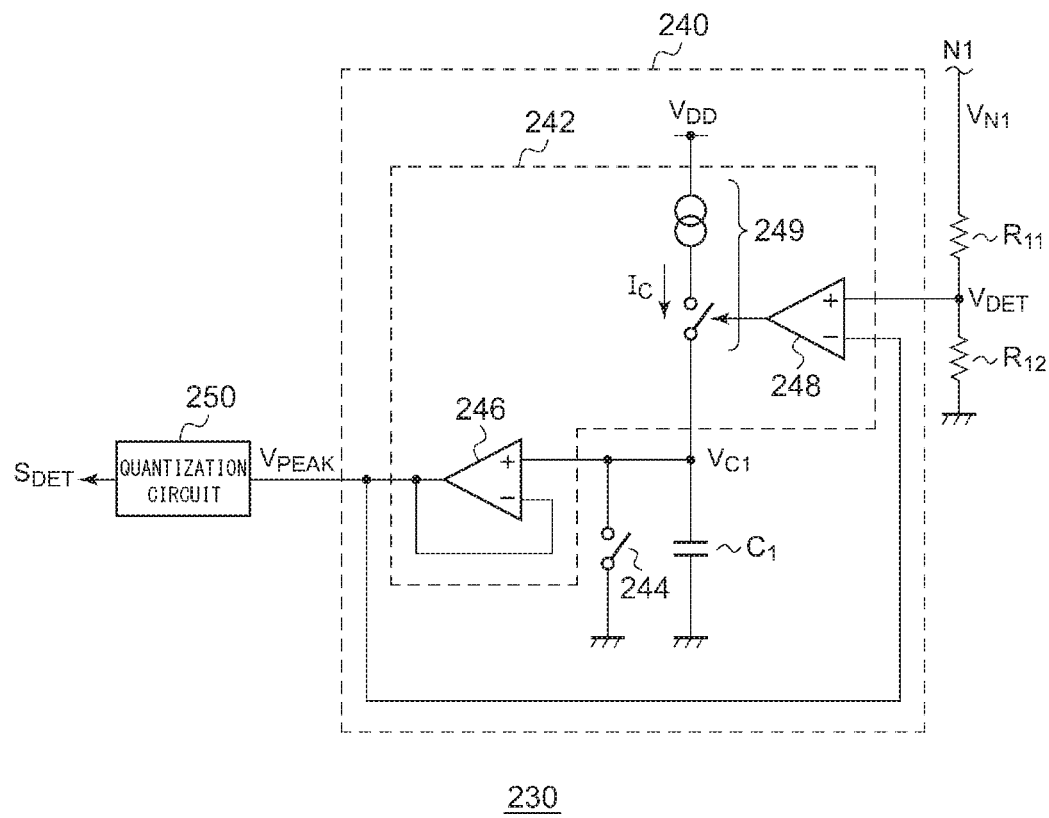
FIG. 4 is a circuit diagram showing an example configuration of a signal level detection circuit.

FIG. 4 is a circuit diagram showing an example configuration of the signal level detection circuit 230. The signal level detection circuit 230 includes a peak hold circuit 240 and a quantization circuit 250. The peak hold circuit 240 receives the detection voltage $V_{DET}$ that corresponds to the coil-end voltage $V_{N1}$ at the connection node N1. Furthermore, the peak hold circuit 240 generates a peak detection value $V_{PEAK}$ that represents the peak of the detection voltage $V_{DET}$, i.e., the peak of the coil-end voltage $V_{N1}$. The quantization circuit 250 quantizes the peak detection value $V_{PEAK}$ generated by the peak hold circuit 240, so as to generate a detection value $S_{DET}$.

Such an arrangement is capable of generating the detection value $S_{DET}$ having a correlation with the degree of coupling between the transmission coil in the selected state and the reception coil.

The peak hold circuit 240 includes a capacitor $C_1$ and a charger circuit 242. One end of the capacitor $C_1$ is grounded. The charger circuit 242 employs the voltage $V_{C1}$ across the capacitor $C_1$ as a threshold value. When the input voltage $V_{DET}$ of the peak hold circuit 240 exceeds the threshold value, the charger circuit 242 charges the capacitor $C_1$. The voltage $V_{C1}$ across the capacitor $C_1$ rises until it reaches the peak of the input voltage $V_{DET}$, and is maintained at this peak level.

The discharge circuit 244 is coupled to the capacitor $C_1$ in parallel. The discharge circuit 244 turns on the peak hold circuit 240 at a reset timing so as to discharge the capacitor $C_1$.

For example, the charger circuit 242 includes a buffer circuit 246, a comparator 248, and a current source 249. The buffer circuit 246 receives the voltage $V_{C1}$ across the capacitor $C_1$ and outputs a peak voltage $V_{PEAK}$ that corresponds to the voltage $V_{C1}$. The comparator 248 compares the output voltage $V_{PEAK}$ of the buffer circuit 246 with the input voltage $V_{DET}$, and generates a comparison signal $S_{CMP}$ that indicates a comparison result. The current source 249 switches to the on state according to the output $S_{CMP}$ of the comparator 248, and specifically, when the relation $V_{DET}>V_{PEAK}$ holds true. In this state, the current source 249 supplies a current $I_C$ to the capacitor $C_1$. The current source 249 may be configured as a combination of a constant current source and a switch, or otherwise as a combination of a resistor and a switch. Such an arrangement is capable of generating the peak voltage $V_{PEAK}$ that represents the peak value of the detection voltage $V_{DET}$. It should be noted that the peak hold circuit may have various kinds of known configurations, which can be clearly understood by those skilled in this art.

Figure 5A:
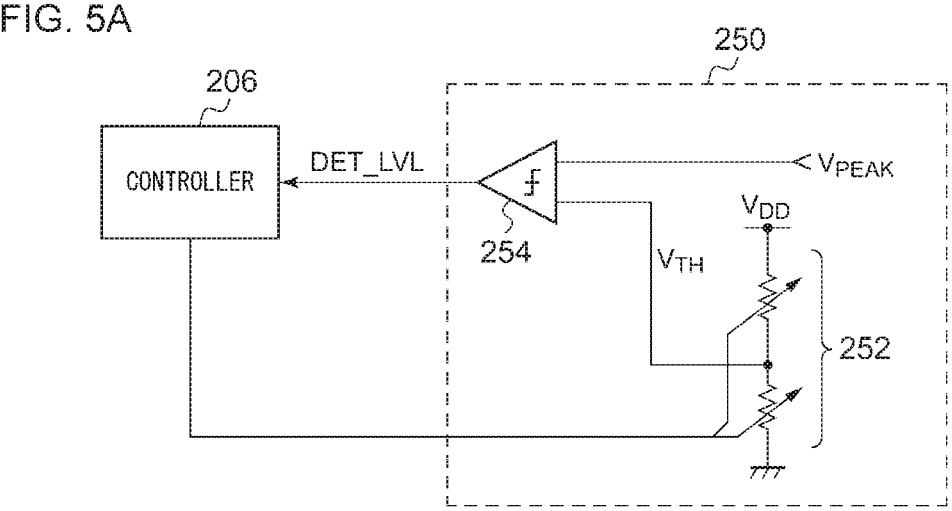
FIGS. 5A and 5B are circuit diagrams each showing a quantization circuit.
Figure 5B:
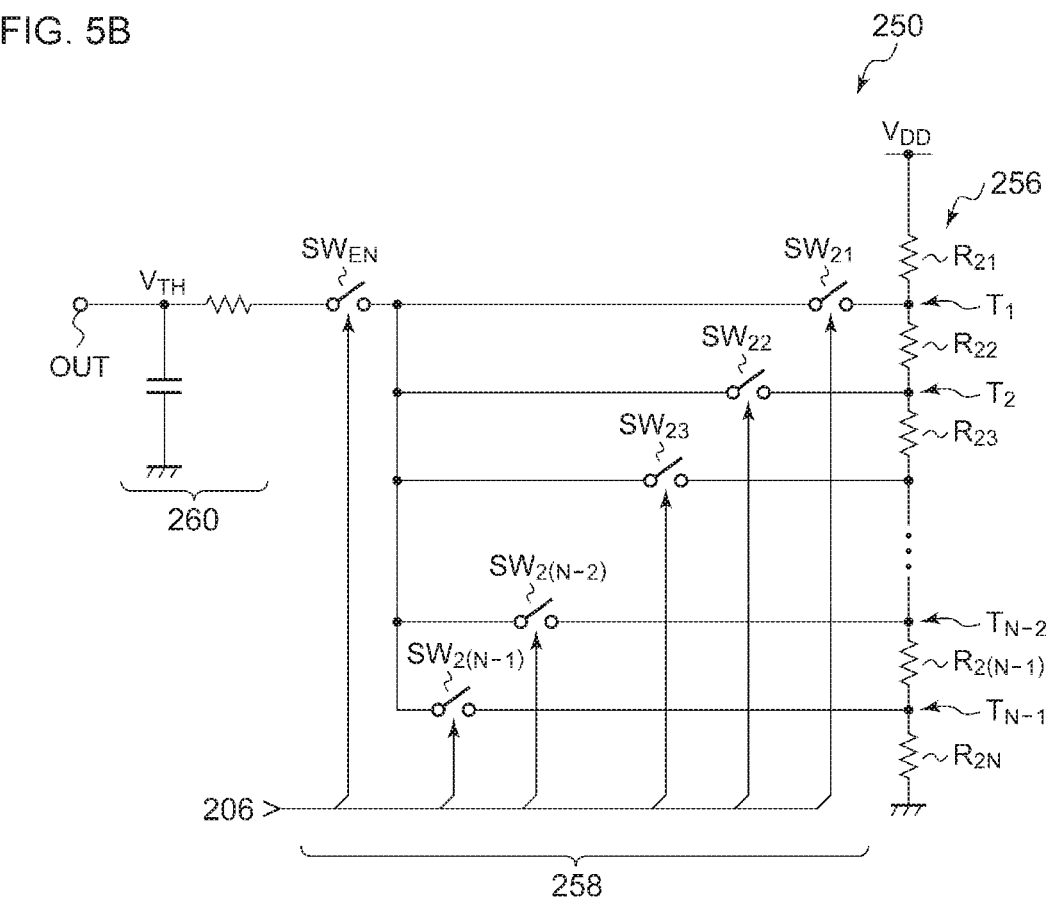

FIGS. 5A and 5B are circuit diagrams showing the quantization circuit 250. The quantization circuit 250 shown in FIG. 5A includes a voltage dividing circuit 252 and a comparator 254. The voltage dividing circuit 252 divides a reference voltage $V_{DD}$, so as to generate a threshold voltage $V_{TH}$. The voltage dividing circuit 252 is configured to have a voltage dividing ratio that is controllable by means of the controller 206. The voltage dividing ratio is adjusted according to a required detection sensitivity.

The comparator 254 compares the output voltage $V_{PEAK}$ of the peak hold circuit 240 with the threshold voltage $V_{TH}$. The controller 206 acquires an output DET_LVL of the comparator 254 for each voltage dividing ratio of the voltage dividing circuit 252 while changing the voltage dividing ratio in a time sharing manner. A set of the multiple signals DET_LVL that correspond to multiple voltage dividing ratio points corresponds to the detection value $S_{DET}$ shown in FIG. 2, which can be clearly understood. With such an arrangement, the level of the output voltage $V_{PEAK}$ of the peak hold circuit 240 is judged based on the point at which the output DET_LVL of the comparator 254 changes.

FIG. 5B shows an example configuration of the voltage dividing circuit 252. The voltage dividing circuit 252 includes a resistor string 256, a switch circuit 258, and a low-pass filter 260. The resistor string 256 includes multiple resistors $R_{21}$ through $R_{2N}$ coupled in series. Furthermore, taps $T_1$ through $T_{N-1}$ are provided to connection nodes connecting adjacent resistors. The switch circuit 258 includes multiple switches $SW_{21}$ through $SW_{2(N-1)}$ each provided between the output terminal OUT and the corresponding one of the multiple taps $T_1$ through $T_{N-1}$, and an enable switch $SW_{EN}$.

In a state in which the enable switch $SW_{EN}$ is turned on, the controller 206 selects one from among the multiple switches $SW_{21}$ through $SW_{2(N-1)}$, turns on the selected switch, and turns off the remaining switches. In a case in which the resistors $R_{21}$ through $R_{2N}$ that form the resistor string 256 all have the same resistance value, when the i-th (i=1 through N-1) switch $SW_{2i}$ is turned on, the voltage dividing ratio is represented by (N-i)/N. Thus, the threshold voltage $V_{TH}$ is generated such that the relation $V_{TH}=V_{DD}\times(N-i)/N$ holds true.

The low-pass filter 260 is provided in order to stabilize the threshold voltage $V_{TH}$. The stabilizing time required for stabilization of the threshold voltage $V_{TH}$ after the state (voltage dividing ratio) of the switch circuit 258 is switched is determined according to the time constant of the low-pass filter 260. For example, in a case in which the low-pass filter 260 is configured of a 10 pF capacitor and a 100 kΩ resistor, the time constant τ is 1 µs.

The controller 206 shown in FIG. 5A may preferably be configured to acquire the output DET_LVL of the comparator 254 after a waiting time of 5 times, and preferably 10 times, the time constant τ after the switch circuit 258 is switched.

It should be noted that the configuration of the quantization circuit 250 is not restricted to such an arrangement shown in FIG. 5A.

FIG. 6 is an operation waveform diagram showing a level judgment operation of the signal level detection circuit 230 shown in FIG. 4. The EN1 signal is an enable signal for a coil selection sequence. With the assertion (high level) of the EN1 signal at the time point $t_0$ as a trigger, the controller 206 instructs the inverter 204 to generate the driving signal S1. As a result, the AC voltage $V_{N1}$ occurs at the connection node N1. The peak hold circuit 240 receives the detection voltage $V_{DET}$ that corresponds to the AC voltage $V_{N1}$, and detects the peak voltage $V_{PEAK}$ thereof. With the assertion of the EN2 signal at the time point $t_1$ as a trigger, an instruction is issued to hold the peak voltage $V_{PEAK}$. The EN3 signal is a trigger for a level judgment operation of the quantization circuit 250.

At the time point t2, the controller 206 starts to control the voltage dividing ratio of the voltage dividing circuit 252. The controller 206 raises the voltage dividing ratio in increments of levels. This raises the threshold voltage $V_{TH}$ in increments of predetermined steps. In an example shown in FIG. 6, during a period in which the voltage dividing ratio is set in a range from the first level to the fifth level, the relation $V_{PEAK}>V_{TH}$ holds true. When the voltage dividing ratio is set to the sixth level, $V_{PEAK}$ becomes smaller than $V_{TH}$. In this stage, the output DET_LVL of the comparator 254 transits to the high level. The controller 206 judges the level of the peak voltage $V_{PEAK}$ based on a point at which the output DET_LVL of the comparator 254 changes. The above is the operation of the signal level detection circuit 230.

By employing the signal level detection circuit 230 shown in FIG. 4, this arrangement is capable of appropriately detecting the amplitude level of the AC voltage $V_{N1}$ at the connection node N1. Furthermore, the quantization circuit 250 shown in FIGS. 5A & 5B has a simple circuit configuration as compared with those of typical A/D converters. This provides an advantage of requiring only a small circuit area, and further provides an advantage of reduced power consumption.

Next, description will be made regarding an example configuration of the power transmission apparatus 200.

Figure 7:
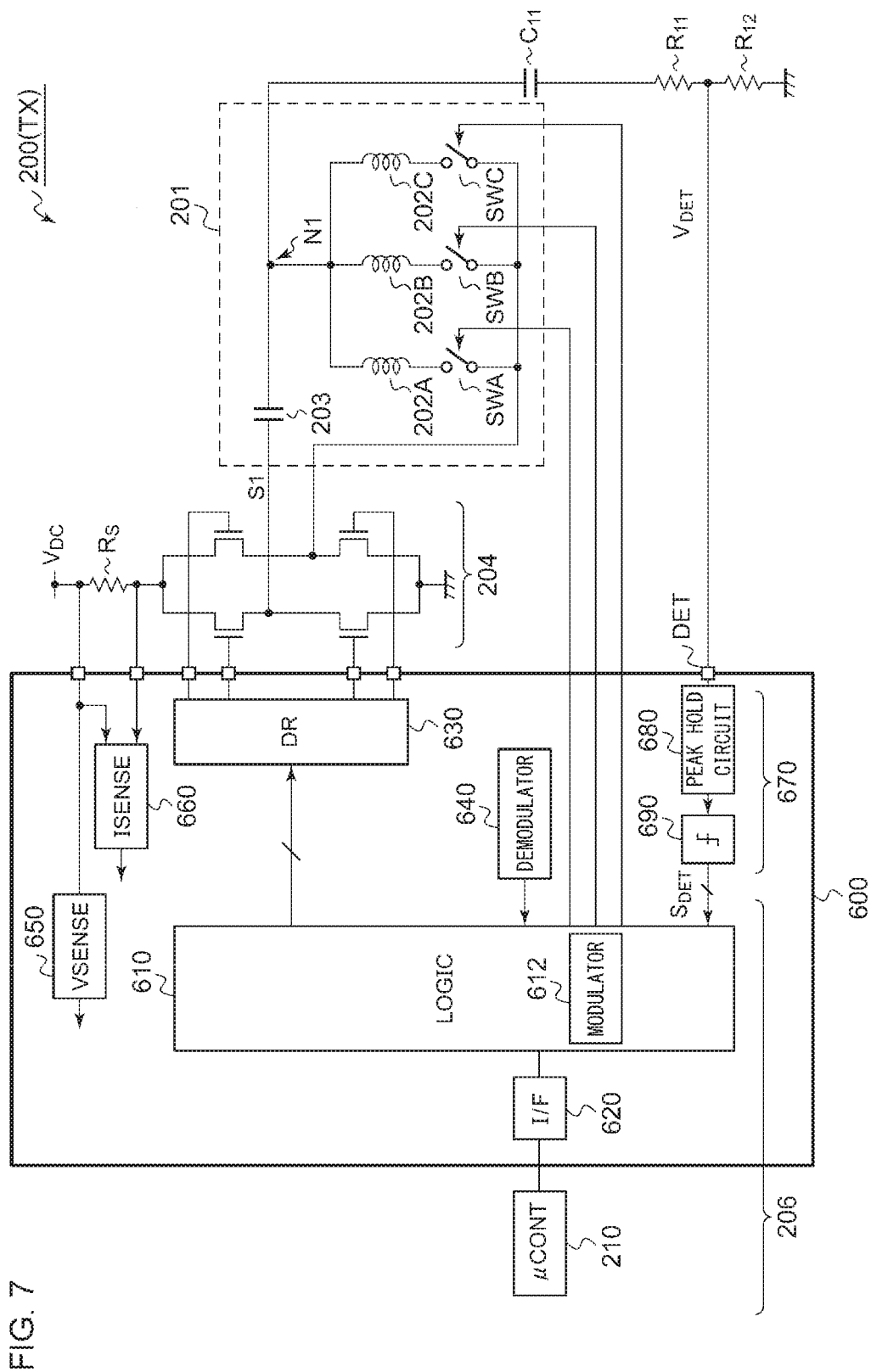
FIG. 7 is a block diagram showing a power transmission apparatus including a transmission control IC.

FIG. 7 is a block diagram showing a power transmission apparatus 200 including a transmission control IC 600. The power transmission apparatus 200 includes the transmission antenna 201, the inverter 204, the transmission control IC 600, and the micro controller 210. The power transmission apparatus 200 supports both the Qi standard and the PMA standard.

The transmission antenna 201 of the power transmission apparatus 200 includes multiple (in this example, three) transmission coils 202A through 202C and multiple switches SWA through SWC. The multiple transmission coils 202A through 202C are arranged on a charging stand with respective position offsets in the horizontal direction. The number of the transmission coils is not restricted in particular. The power transmission apparatus 200 selects one from among the transmission coils that exhibits the strongest coupling with the power receiving apparatus RX. Subsequently, the power transmission apparatus 200 performs the power supply operation. Specifically, the power transmission apparatus 200 turns on one of the multiple switches SWA through SWC that corresponds to the transmission coil 202 thus selected, and turns off the remaining switches.

The inverter 204 is configured as a full-bridge circuit, and applies an AC driving signal S1 to the transmission antenna 201. A sensing resistor $R_S$ is provided to the input stage of the inverter 204.

The micro controller 210 executes a program loaded from ROM, so as to execute various kinds of operations defined for the Qi standard and the PMA standard.

The transmission control IC 600 includes a logic circuit 610, an interface circuit 620, a driver 630, a demodulator 640, a voltage detection circuit 650, a current detection circuit 660, a signal level detection circuit 670, and the like, which are monolithically integrated on a single semiconductor substrate.

The logic circuit 610 and the micro controller 210 are coupled via an I²C (Inter IC) bus and the interface circuit 620, which allows information to be transmitted and received between them. The micro controller 210 and the logic circuit 610 of the transmission control IC 600 correspond to the controller 206 shown in FIG. 2.

The driver 630 drives the inverter 204 according to a control instruction received from the logic circuit 610. It should be noted that a bootstrap circuit is coupled to the driver 630, which is not shown in FIG. 7.

The logic circuit 610 controls the driver 630. Furthermore, the logic circuit 610 controls the selection of the multiple transmission coils 202A through 202C.

The voltage detection (DET) pin of the power transmission IC 600 receives, as an input signal, the detection voltage $V_{DET}$ that corresponds to the voltage $V_{N1}$ at the common connection node N1 that connects the multiple transmission coils 202A through 202C. The signal level detection circuit 670 converts the detection voltage $V_{DET}$ into a multi-level detection value, and outputs the multi-level detection value to the logic circuit 610. The signal level detection circuit 670 corresponds to the signal level detection circuit 230 shown in FIG. 2.

The logic circuit 610 operates the driver 630 while sequentially selecting the multiple transmission coils 202A through 202C, and acquires a detection value from the signal level detection circuit 670 (which corresponds to $S_{DET}$ shown in FIG. 4 and to DET_LVL shown in FIGS. 5A & 5B, for example). Subsequently, (ii) the logic circuit 610 determines a single transmission coil to be used for power supply, based on the results of comparison of the multiple detection values thus acquired that correspond to the multiple coils.

The logic circuit 610 controls the overall operation of the power transmission apparatus 200, and identifies the power receiving apparatus RX. Furthermore, after the start of the power supply operation (in the power transfer phase), the logic circuit 610 controls the electric power to be transmitted, based on a signal received from the power receiving apparatus RX. The control operations employed to control the electric power to be transmitted include: (i) switching of the operation mode of the inverter 204 (full-bridge mode/ half-bridge mode); (ii) controlling the switching frequency of the inverter 204; (iii) controlling the phase applied to the inverter 204; and (iv) controlling the duty ratio applied to the inverter 204.

The logic circuit 610 includes an FM modulator 612, and modulates the switching frequency of the inverter 204 according to a signal (packet) to be transmitted from the power transmission apparatus TX to the power receiving apparatus RX.

The demodulator 640 demodulates a received signal that has been AM modulated by the power receiving apparatus RX, based on the electrical state of the transmission antenna 201. The received signal includes a CE packet and an SS packet that conform to the Qi standard, or otherwise a DEC signal, an INC signal, and a NoCh signal that conform to the PMA standard, etc. The configuration of the demodulator 640 is not restricted in particular.

The voltage detection circuit 650 detects the input voltage VDC of the inverter 204. Furthermore, the current detection circuit 660 detects a current that flows through the inverter 204, based on a voltage drop that occurs across the sensing resistor $R_S$. The detection values of the voltage and the current are input to the logic circuit 610. The logic circuit 610 or otherwise the micro controller 210 calculates the electric power transmitted from the power transmission apparatus 200. The detected values of the voltage and current are also used for the overvoltage protection (OVP), overcurrent protection (OCP), etc.

Next, description will be made regarding a selection operation of the power transmission apparatus 200 for selecting a transmission coil from among the multiple transmission coils 202.

Figure 8:
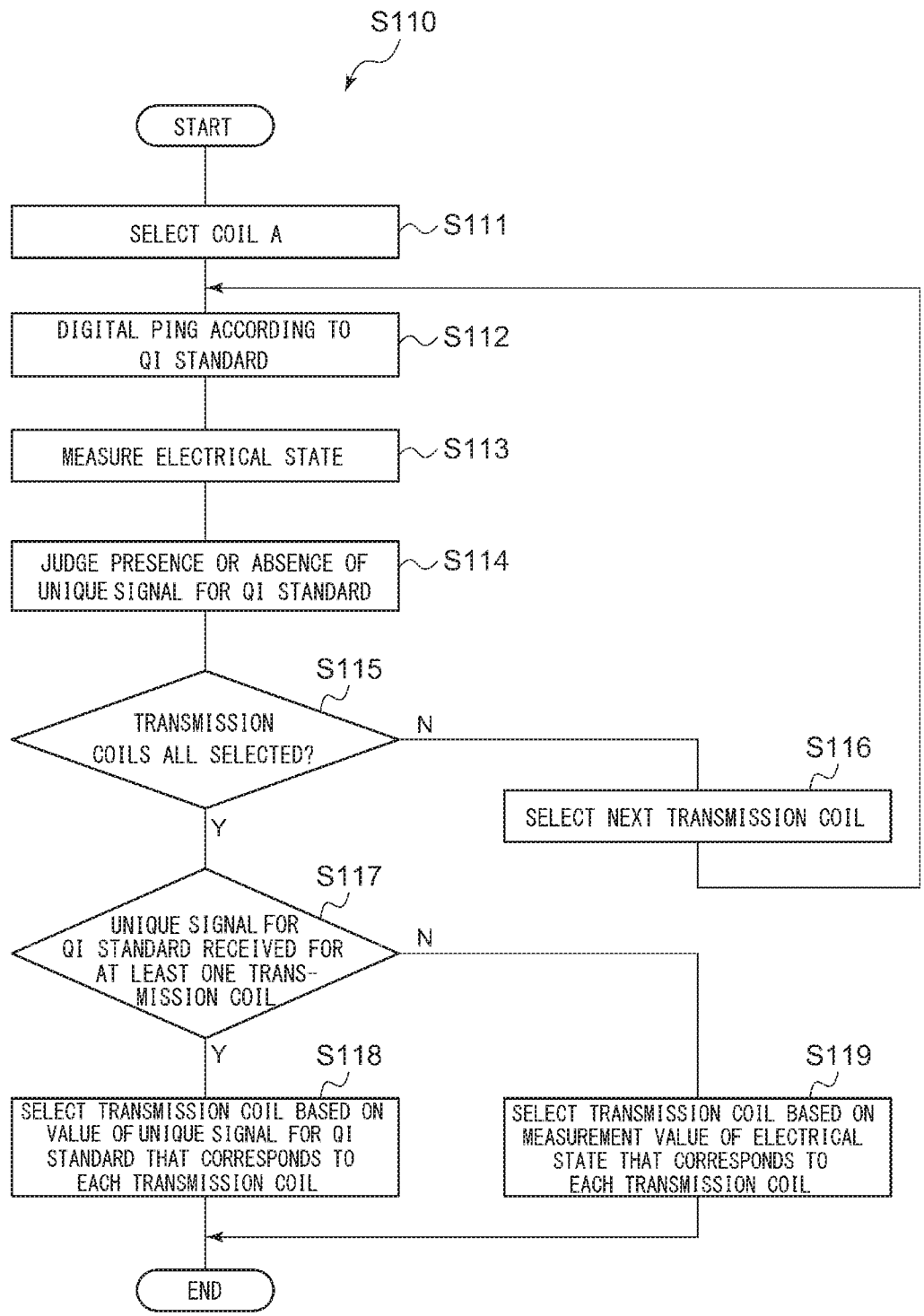
FIG. 8 is a flowchart showing the selection from among multiple transmission coils.

FIG. 8 is a flowchart showing the selection from among the multiple transmission coils. The power transmission apparatus 200 selects one transmission coil 202A from among the multiple transmission coils 202A through 202C (S111), and sends a digital ping according to the Qi standard (S112). Furthermore, the power transmission apparatus 200 measures the electrical state of the transmission coil 202A (S113), and judges whether or not an unique signal (SS packet) defined for the Qi standard has been received (S114). When the the transmission coils have not all been selected (NO in S115), the next transmission coil (202B, 202C, . . . ) is selected (S116).

The electrical state to be measured in Step S113 preferably indicates the degree of coupling between the selected transmission coil and the reception coil. From this viewpoint, in FIG. 7, the voltage $V_{N1}$ that occurs at a connection node N1 that connects the resonance capacitor 203 and the multiple transmission coils 202 is preferably measured. Specifically, the voltage $V_{N1}$ at the connection node N1 (coil-end voltage) is divided by means of resistors $R_{11}$ and $R_{12}$, and the voltage thus divided is input to a voltage detection pin DET of the transmission control IC 600.

The coil-end voltage $V_{N1}$ is an AC voltage. The controller 206 measures the amplitude of the coil-end voltage $V_{N1}$. The signal level detection circuit 670 detects the coil-end voltage $V_{N1}$ that occurs in each state in which the corresponding transmission coil is selected from among the multiple transmission coils 202A through 202C. The controller 206 determines one transmission coil to be used for power supply, based on the results of comparison of the measurement values of the coil-end voltage $V_{N1}$ acquired for the multiple transmission coils.

The signal level detection circuit 670 includes a peak hold circuit 680 and a quantization circuit 690, for example. The peak hold circuit 680 holds the peak of the voltage at the voltage detection pin DET. The peak value thus held represents the amplitude of the coil-end voltage $V_{N1}$. The quantization circuit 690 quantizes the output of the peak hold circuit 680. The data $S_{DET}$ thus quantized is input to the logic circuit 610. The quantization circuit 690 may be configured as a high-precision A/D converter or otherwise a level judgment circuit having a simple configuration as shown in FIGS. 5A & 5B. The logic circuit 610 receives the detection value $S_{DET}$ acquired in each state in which the corresponding transmission coil 202 is selected, and holds the detection value $S_{DET}$.

After the measurement of the electrical state (coil-end voltage) has been completed for all the transmission coils thus selected in the flowchart shown in FIG. 8 (YES in S115), the flow transits to the judgment operation for determining the coil to be used.

As a result of sending the digital ping according to the Qi standard (S112), when an unique signal (SS packet) defined for the Qi standard has been received for at least one transmission coil (YES in S117), the transmission coil 202 to be used in the subsequent operations is determined based on the results of comparison of the unique signals (S118). Specifically, such an arrangement may select the transmission coil 202 that corresponds to the SS packet having the largest value or otherwise having a value in a suitable range.

As a result of sending the digital ping according to the Qi standard (S112), when an unique signal (SS packet) defined for the Qi standard has not been received from any one of the transmission coils 202 (NO in S117), the transmission coil 202 to be used in the subsequent operations is determined based on the comparison of the electrical states (coil-end voltages $V_{N1}$) measured for the respective transmission coils 202 in Step S113.

With this control operation, even in a case in which the power receiving apparatus RX conforms to the second method (PMA standard), such an arrangement is capable of selecting an optimum transmission coil by performing a digital ping operation that conforms to the first method (Qi standard) without a need to perform a digital ping operation that conforms to the second method. This allows the optimum transmission coil to be determined in a short period of time.

In a case of the second method, such as the PMA standard, in which a signal having a correlation with the degree of coupling between the transmission coil and the power receiving coil is not transmitted in the digital ping phase, the degree of coupling is estimated based on the electrical state of the transmission coil (transmission antenna). This allows the optimum coil to be selected.

Description will be further made regarding the advantages of the power transmission apparatus 200 shown in FIG. 7.

Typically, the micro controller 210 includes a built-in A/D converter. Accordingly, in a case in which the controller 206 is configured of the micro controller 210 and the logic circuit 610, an arrangement is conceivable in which the built-in A/D converter of the micro controller 210 is used to judge the level of the coil-end voltage $V_{N1}$. However, with such an arrangement, before the built-in A/D converter is used, there is a need to start up the micro controller 210.

In contrast, the transmission control IC 600 shown in FIG. 7 includes a hardware component (signal level detection circuit 670) that judges the signal level of the coil-end voltage $V_{N1}$. Accordingly, such an arrangement is not required to start up the micro controller 210 before the selection of the transmission coil. This allows power consumption to be reduced for the overall operation of the power transmission apparatus 200.

In addition, in such a case in which the A/D converter built into the micro controller 210 is used, the A/D converter requires a high-precision reference voltage. With such an arrangement, the reference voltage must be supplied from an external circuit of the micro controller. That is to say, such an arrangement requires an external reference voltage source. In contrast, the power transmission IC 600 shown in FIG. 7 does not require such a high-precision reference voltage source. This allows the circuit area to be reduced.

Also, a high-precision A/D converter may be employed as the quantization circuit 690 of the signal level detection circuit 670. However, this leads to a problem of increased power consumption in the A/D converter and an accompanying analog circuit. Accordingly, by employing the level judgment circuit having a simple configuration as shown in FIGS. 5A & 5B as the quantization circuit 690, this allows power consumption to be further reduced as compared with an arrangement employing such a high-precision A/D converter.

Making a comparison between the comparison technique and the transmission control IC 600, it has been found that power consumption of 47.8 mW involved in the comparison technique can be reduced to 40.8 mA, which provides a high energy-saving rate of 14.6%, by means of a combination of: (1) an effect in which the operation of the micro controller 210 can be suspended; (2) an effect in which an A/D converter is not required; and (3) an effect in which an analog circuit (reference voltage generating circuit) accompanying an A/D converter is not also required because such an A/D converter is not required.

Description has been made above regarding the the present invention with reference to the embodiments. The above-described embodiments have been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

First Modification

Description has been made in the embodiment regarding a wireless power transmission apparatus that supports the Qi standard and the PMA standard. However, the present invention is not restricted to such an arrangement. Also, the present invention is applicable to wireless power transmission apparatuses that support other methods similar to the Qi standard and the PMA standard, or otherwise to wireless power transmission apparatuses that support specifications that will be developed in the future.

Second Embodiment

Figure 9:
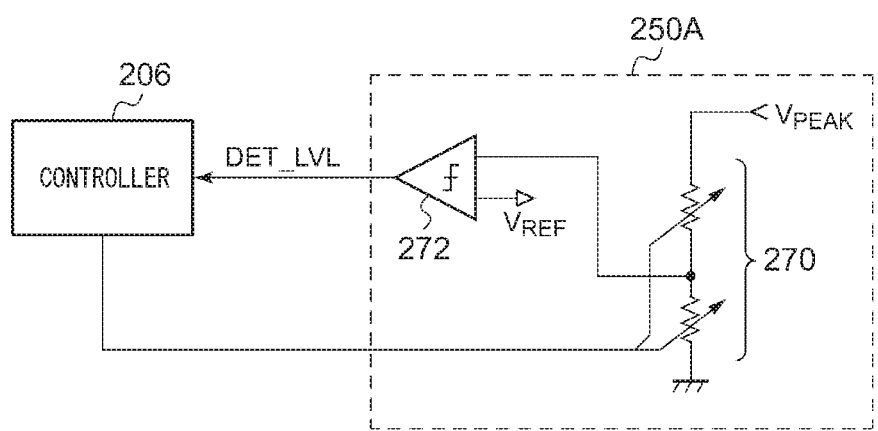
FIG. 9 is a circuit diagram showing a quantization circuit according to a second modification.

FIG. 9 is a circuit diagram showing a quantization circuit 250A according to a second embodiment. The quantization circuit 250A includes a voltage dividing circuit 270 and a comparator 272. The voltage dividing circuit 270 divides the peak detection voltage $V_{PEAK}$ with a variable voltage dividing ratio. The comparator 272 compares the peak detection voltage $V_{PEAK}'$ thus divided with a predetermined threshold value (reference voltage) $V_{TH}$. The controller 206 acquires the output DET_LVL of the comparator 272 for each voltage dividing ratio while changing the voltage dividing ratio of the voltage dividing circuit 270 in a time sharing manner. A set of the multiple signals DET_LVL that corresponds to respective multiple voltage dividing ratio points corresponds to the detection value $S_{DET}$ shown in FIG. 2. Subsequently, the level of the output voltage $V_{PEAK}$ of the peak hold circuit 680 is judged based on the point at which the output DET_LVL of the comparator 254 changes.

Third Modification

When the distance between the power receiving apparatus RX and the transmission antenna 201 suddenly changes in the transmission of the electric power signal S2 to the power receiving apparatus RX after the optimum transmission coil has been selected, this leads to a sudden change in the degree of coupling between the transmission coil 202 and the reception coil. If the degree of coupling suddenly rises at a high rate that is higher than the response speed of the feedback control operation for the electric power to be transmitted, the internal voltage of the power receiving apparatus RX suddenly rises. This has the adverse effects on reliability. In order to solve such a problem, the signal level detection circuit 230 of the power transmission apparatus 200 may monitor the coil-end voltage $V_{N1}$ even in the power transmission operation (power transfer phase). When the degree of coupling suddenly rises, such an arrangement is capable of performing a protection operation such as an operation for reducing electric power to be transmitted.

While the preferred embodiments of the present invention have been described using specific terms, such description is for illustrative purposes only, and it is to be understood that changes and variations may be made without departing from the spirit or scope of the appended claims.

What is claimed is:

1. A wireless power transmission apparatus which supplies an electric power signal to a wireless power receiving apparatus, the wireless power transmission apparatus comprising:
    a transmission antenna comprising a series resonance capacitor and a plurality of switchable transmission coils;
    an inverter having an output coupled to the transmission antenna;
    a controller which is operably coupled to the inverter and controls the inverter; and
    a signal level detection circuit which is operably coupled to the transmission antenna and generates a detection value that corresponds to a voltage at a connection node that connects the series resonance capacitor and the plurality of transmission coils,
    wherein (i) the controller drives the inverter while sequentially selecting the plurality of transmission coils, and acquires the detection values from the signal level detection circuit,
    and wherein (ii) the controller determines a single transmission coil to be used for power supply, based on results of comparison of the detection values acquired for the respective transmission coils;
    wherein the signal level detection circuit comprises:
        a peak hold circuit which is operably coupled to the connection node and receives a signal that corresponds to a voltage at the connection node; and
        a quantization circuit which is operably coupled to an output of the peak hold circuit and quantizes an output voltage of the peak hold circuit so as to generate the detection value;
    wherein the quantization circuit comprises:
        a voltage dividing circuit which is operably coupled to the controller and generates a threshold voltage by dividing a reference voltage with a voltage dividing ratio that can be controlled by the controller; and
        a first comparator which is operably coupled to the peak hold circuit and the threshold voltage generated by the voltage dividing circuit, the first comparator receiving an output voltage of the peak hold circuit and the threshold voltage as inputs,
    and wherein the detection value corresponds to a set of outputs of the first comparator acquired for each voltage dividing ratio.

2. The wireless power transmission apparatus according to claim 1, wherein the peak hold circuit comprises:
    a capacitor; and
    a charger circuit operably which is coupled to the capacitor and uses a voltage across the capacitor as a threshold value, and charges the capacitor when an input voltage of the peak hold circuit exceeds the threshold value.

3. The wireless power transmission apparatus according to claim 2, wherein the charger circuit comprises:
    a buffer circuit which receives the voltage across the capacitor;
    a second comparator operably coupled to an output of the buffer circuit and the input voltage, the second comparator receiving an output voltage of the buffer circuit and the input voltage as inputs; and
    a current source which is operably coupled to an output of the second comparator and transits to an on state according to an output of the second comparator, and a current to the capacitor.

4. The wireless power transmission apparatus according to claim 1, wherein the wireless power receiving apparatus supports the PMA standard; and
    wherein, in selection of the transmission coil, the controller controls the inverter so as to send a digital ping that conforms to the Qi standard.

5. A power transmission control circuit which controls a wireless power transmission apparatus for supplying an electric power signal to a wireless power receiving apparatus, wherein the wireless power transmission apparatus comprises:
    a transmission antenna comprising a series resonance capacitor and a plurality of switchable transmission coils; and
    an inverter having an output coupled to the transmission antenna,
    wherein the power transmission control circuit comprises:
        a driver operably which is coupled to the inverter and drives the inverter;
        a logic circuit which is operably coupled to the driver and controls the driver, and controls selection from among the plurality of transmission coils;
        a voltage detection pin which is operably coupled to the transmission antenna and receives a detection voltage that corresponds to a voltage at a common connection node that connects the plurality of transmission coils;
        a signal level detection circuit which is operably coupled to the transmission antenna and converts the detection voltage into a multi-level detection value, and outputs the multi-level detection value to the logic circuit; and
        an interface circuit which is operably coupled to the logic circuit and interfaces with an external microcontroller, wherein (i) the logic circuit operates the driver while sequentially selecting the plurality of transmission coils, and acquires the detection values from the signal level detection circuit, and wherein (ii) the logic circuit determines a single transmission coil to be used for power supply, based on results of comparison of the detection values acquired for the respective transmission coils;

wherein the signal level detection circuit comprises:
- a peak hold circuit which is operably coupled to the connection node and receives the detection value; and
- a quantization circuit which is operably coupled to an output of the peak hold circuit and quantizes an output voltage of the peak hold circuit so as to generate the detection value;

wherein the quantization circuit comprises:
- a voltage dividing circuit which is operably coupled to the controller and generates a threshold voltage by dividing a reference voltage with a voltage dividing ratio that can be controlled by the logic circuit; and
- a first comparator which is operably coupled to the peak hold circuit and the threshold voltage generated by the voltage dividing circuit, the first comparator receiving an output voltage of the peak hold circuit and the threshold voltage as inputs,
- and wherein the detection value corresponds to a set of outputs of the first comparator acquired for each voltage dividing ratio.

6. The power transmission control circuit according to claim 5, wherein the peak hold circuit comprises:
- a capacitor; and
- a charger circuit which is operably coupled to the capacitor and uses a voltage across the capacitor as a threshold value, and charges the capacitor when an input voltage of the peak hold circuit exceeds the threshold value.

7. The power transmission control circuit according to claim 6, wherein the charger circuit comprises:
- a buffer circuit which receives the voltage across the capacitor;
- a second comparator which is operably coupled to an output of the buffer circuit and the input voltage, the second comparator receiving an output voltage of the buffer circuit and the input voltage as inputs; and
- a current source which is operably coupled to an output of the second comparator and transits to an on state according to an output of the second comparator, and supplies a current to the capacitor.

8. The power transmission control circuit according to claim 5, wherein the wireless power receiving apparatus supports the PMA standard; and
wherein, in selection of the transmission coil, the logic circuit controls the inverter so as to send a digital ping that conforms to the Qi standard.

9. A wireless power transmission apparatus which supplies an electric power signal to a wireless power receiving apparatus, the wireless power transmission apparatus comprising:
- a transmission antenna comprising a series resonance capacitor and a plurality of switchable transmission coils;
- an inverter having an output coupled to the transmission antenna;
- a controller which is operably coupled to the inverter and controls the inverter; and
- a signal level detection circuit which is operably coupled to the transmission antenna and generates a detection value that corresponds to a voltage at a connection node that connects the series resonance capacitor and the plurality of transmission coils, wherein (i) the controller drives the inverter while sequentially selecting the plurality of transmission coils, and acquires the detection values from the signal level detection circuit, and wherein (ii) the controller determines a single transmission coil to be used for power supply, based on results of comparison of the detection values acquired for the respective transmission coils;

wherein the signal level detection circuit comprises:
- a peak hold circuit which is operably coupled to the connection node and receives a signal that corresponds to a voltage at the connection node; and
- a quantization circuit which is operably coupled to an output of the peak hold circuit and quantizes an output voltage of the peak hold circuit so as to generate the detection value;

wherein the quantization circuit comprises:
- a voltage dividing circuit which is operably coupled to the controller and divides the output voltage of the peak hold circuit with a voltage dividing ratio that can be controlled by the controller; and
- a first comparator which is operably coupled to the voltage dividing circuit and the threshold voltage and receives an output voltage of the voltage dividing circuit and the threshold voltage as inputs,
wherein the detection value corresponds to a set of outputs of the first comparator acquired for each voltage dividing ratio.

10. The wireless power transmission apparatus according to claim 9, wherein the peak hold circuit comprises:
- a capacitor; and
- a charger circuit which is operably coupled to the capacitor and uses a voltage across the capacitor as a threshold value, and charges the capacitor when an input voltage of the peak hold circuit exceeds the threshold value.

11. The wireless power transmission apparatus according to claim 10, wherein the charger circuit comprises:
- a buffer circuit which receives the voltage across the capacitor;
- a second comparator which is operably coupled to an output of the buffer circuit and the input voltage, the second comparator receiving an output voltage of the buffer circuit and the input voltage as inputs; and
- a current source which is operably coupled to an output of the second comparator and transits to an on state according to an output of the second comparator, and supplies a current to the capacitor.

12. The wireless power transmission apparatus according to claim 9, wherein the wireless power receiving apparatus supports the PMA standard;
wherein, in selection of the transmission coil, the logic circuit controls the inverter so as to send a digital ping that conforms to the Qi standard.

13. A power transmission control circuit which controls a wireless power transmission apparatus for supplying an electric power signal to a wireless power receiving apparatus, wherein the wireless power transmission apparatus comprises:
- a transmission antenna comprising a series resonance capacitor and a plurality of switchable transmission coils; and an inverter having an output coupled to the transmission antenna, wherein the power transmission control circuit comprises:
- a driver which is operably coupled to the inverter and drives the inverter;
- a logic circuit which is operably coupled to the driver and controls the driver, and controls selection from among the plurality of transmission coils;
- a voltage detection pin which is operably coupled to the transmission antenna and receives a detection voltage that corresponds to a voltage at a common connection node that connects the plurality of transmission coils;
- a signal level detection circuit which is operably coupled to the transmission antenna and converts the detection voltage into a multi-level detection value, and outputs the multi-level detection value to the logic circuit; and
- an interface circuit which is operably coupled to the logic circuit and interfaces with an external microcontroller, wherein (i) the logic circuit operates the driver while sequentially selecting the plurality of transmission coils, and acquires the detection values from the signal level detection circuit, and wherein (ii) the logic circuit determines a single transmission coil to be used for power supply, based on results of comparison of the detection values acquired for the respective transmission coils;

wherein the signal level detection circuit comprises:
- a peak hold circuit which is operably coupled to the connection node and receives the detection value; and
- a quantization circuit which is operably coupled to an output of the peak hold circuit and quantizes an output voltage of the peak hold circuit so as to generate the detection value;

wherein the quantization circuit comprises:
- a voltage dividing circuit which is operably coupled to the controller and divides the output voltage of the peak hold circuit with a voltage dividing ratio that can be controlled by the logic circuit; and
- a first comparator which is operably coupled to the voltage dividing circuit and the threshold voltage and receives an output voltage of the voltage dividing circuit and the threshold voltage as inputs, wherein the detection value corresponds to a set of outputs of the first comparator acquired for each voltage dividing ratio.

14. The power transmission control circuit according to claim 13, wherein the peak hold circuit comprises:
- a capacitor; and
- a charger circuit which is operably coupled to the capacitor and uses a voltage across the capacitor as a threshold value, and charges the capacitor when an input voltage of the peak hold circuit exceeds the threshold value.

15. The power transmission control circuit according to claim 14, wherein the charger circuit comprises:
- a buffer circuit which receives the voltage across the capacitor;
- a second comparator which is operably coupled to an output of the buffer circuit and the input voltage, the second comparator receiving an output voltage of the buffer circuit and the input voltage as inputs; and
- a current source which is operably coupled to an output of the second comparator and transits to an on state according to an output of the second comparator, and supplies a current to the capacitor.

16. The power transmission control circuit according to claim 13, wherein the wireless power receiving apparatus supports the PMA standard; and wherein, in selection of the transmission coil, the logic circuit controls the inverter so as to send a digital ping that conforms to the Qi standard.

\* \* \* \* \*